(12) United States Patent
Isenburg et al.

(10) Patent No.: US 10,746,344 B2
(45) Date of Patent: Aug. 18, 2020

(54) MULTI-PART LINE HAVING AN INSULATING ELEMENT FOR INSULATING A TRANSITION REGION BETWEEN CONNECTOR ASSEMBLIES

(71) Applicant: VOSS Automotive GmbH, Wipperfürth (DE)

(72) Inventors: Marco Isenburg, Ratingen (DE); Tobias Etscheid, Lindlar (DE); Reinhard Plietsch, Wermelskirchen (DE); Otfried Schwarzkopf, Kürten (DE); Reiner Mitterer, Wipperfürth (DE); Michele Stelluto, Remscheid (DE)

(73) Assignee: VOSS AUTOMOTIVE GMBH, Wipperfürth (DE)

( * ) Notice: Subject to any disclaimer, the term of this patent is extended or adjusted under 35 U.S.C. 154(b) by 237 days.

(21) Appl. No.: 15/028,116

(22) PCT Filed: Oct. 10, 2014

(86) PCT No.: PCT/EP2014/002745
§ 371 (c)(1),
(2) Date: Apr. 8, 2016

(87) PCT Pub. No.: WO2015/051919
PCT Pub. Date: Apr. 16, 2015

(65) Prior Publication Data
US 2016/0238188 A1    Aug. 18, 2016

(30) Foreign Application Priority Data

Oct. 10, 2013  (DE) .................. 10 2013 016 855

(51) Int. Cl.
*F16L 53/30* (2018.01)
*F16L 59/18* (2006.01)
(Continued)

(52) U.S. Cl.
CPC ............. *F16L 59/181* (2013.01); *F16L 37/10* (2013.01); *F16L 37/12* (2013.01); *F16L 53/30* (2018.01);
(Continued)

(58) Field of Classification Search
CPC ...... F16L 59/188; F16L 59/187; F16L 59/185; F16L 59/184; F16L 59/182; F16L 59/181;
(Continued)

(56) References Cited

U.S. PATENT DOCUMENTS 344,157 A *  6/1886  Bogan ................. F16L 37/23
                                                         137/614.05
3,608,933 A *  9/1971  Lee .................... E21B 17/043
                                                         285/334
(Continued)

FOREIGN PATENT DOCUMENTS

DE  10 2010 035 028 A1   2/2012
EP       0 509 899 A1   10/1992
(Continued)

OTHER PUBLICATIONS

European Office Action from the European Patent Application No. 14 799 337.2 dated Jun. 29, 2018.

*Primary Examiner* — Aaron M Dunwoody
(74) *Attorney, Agent, or Firm* — Hudak, Shunk & Farine Co. LPA

(57) ABSTRACT

A multi-part line, wherein line parts are provided, at ends of said line parts, with at least one connector assembly having at least one retaining element, wherein a connector part of the connector assembly of a line part and a coupling part of the connector assembly of the adjacent line part can be or are connected by overplugging and locking the at least one retaining element. At least one insulating element is arranged in the overplugging region of the connector part of (Continued)

the connector assemblies that can be or are connected to each other, which insulating element is designed as an axially compressible closed ring made of a material that has low heat conduction at least in the outer region of the insulating element, which ring has an inner passage opening in order provide insulation in the overplugging regions between the connector assemblies, in which overplugging regions no heating by, for example, the engine of a vehicle or other heat sources occurs, which insulation enables economical and also effective insulation during the operation and also during the standstill of a vehicle and is protected against unintentional or inadvertent removal.

18 Claims, 7 Drawing Sheets

(51) Int. Cl.
*F16L 37/10* (2006.01)
*F16L 37/12* (2006.01)

(52) U.S. Cl.
CPC ...... *F01N 2610/02* (2013.01); *F01N 2610/14* (2013.01); *F01N 2610/1486* (2013.01)

(58) Field of Classification Search
CPC . F16L 53/00; F16L 53/34; F16L 53/35; F16L 53/30
USPC .......................................... 285/305, 81, 89
See application file for complete search history.

(56) References Cited

U.S. PATENT DOCUMENTS

| | | | | |
|---|---|---|---|---|
| 3,712,583 | A * | 1/1973 | Martindale | F16L 29/02 251/149.4 |
| 3,845,974 | A | 11/1974 | Pelloux-Gervais | |
| 4,084,842 | A | 4/1978 | Stonitsch et al. | |
| 4,332,273 | A * | 6/1982 | Boyce | F16L 29/02 137/322 |
| 5,921,580 | A * | 7/1999 | Dyer | F16L 19/00 283/32 |
| 6,857,663 | B2 * | 2/2005 | Nagata | F16L 37/0987 285/319 |
| 8,827,321 | B2 * | 9/2014 | Defilippi | F16L 37/133 285/322 |
| 2001/0054819 | A1 * | 12/2001 | Guest | F16L 37/0985 285/81 |
| 2003/0080553 | A1 * | 5/2003 | Wieder | F16L 37/00 285/81 |
| 2006/0108799 | A1 * | 5/2006 | Ghilardi | F16L 39/04 285/272 |

FOREIGN PATENT DOCUMENTS

EP         1 985 908 A1    10/2008
FR         2 659 416 A1    3/1990

\* cited by examiner

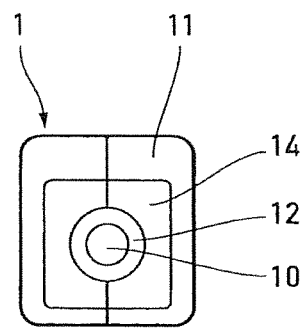
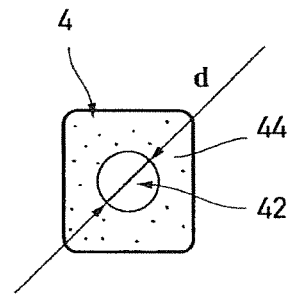
*Fig.9*  *Fig.10*
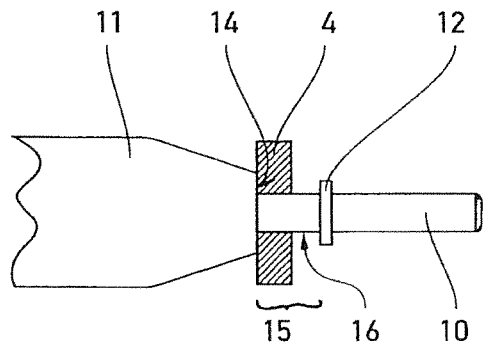
*Fig.11*
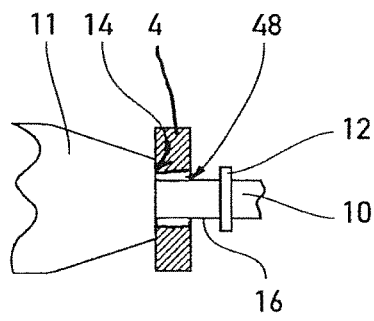
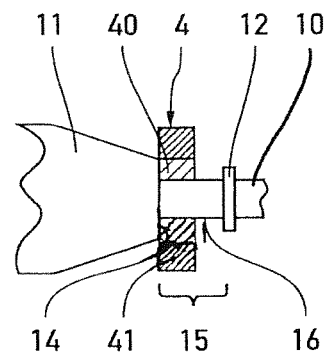
*Fig.12*  *Fig.13*

US 10,746,344 B2

MULTI-PART LINE HAVING AN INSULATING ELEMENT FOR INSULATING A TRANSITION REGION BETWEEN CONNECTOR ASSEMBLIES

FIELD OF THE INVENTION

The invention relates to an insulating element for insulating a transition region between connector assemblies between two line parts, which are or can be connected to each other in a overplugging step, as well as a multipart line, wherein the ends of the line parts are provided with at least one connector assembly with at least one retaining element, wherein the connector part of the connector assembly of a line part and coupling part of the connector assembly of the adjacent line part can be or are connected to each other by overplugging and locking the at least one retaining element.

BACKGROUND OF THE INVENTION

Insulating and protective covers for insulating or protecting heatable plug connections are known in prior art. Plug connections provided with such an insulating and protective cover or outer encapsulation will here be referred to below as a connector assembly. They are used to connect at least two line parts or media lines, as well as to hook up a media line to any aggregate, in particular one provided in a motor vehicle. These media lines and line parts thereof are used to carry various types of media, wherein the latter in part exhibit a high freezing point, and hence already tend to freeze at relatively high ambient temperatures. As a result, the actual functions to be performed by these media can be impaired or even completely prevented. This is possible in particular in water lines for the windshield wiper system in vehicles, and primarily in so-called AdBlue® lines, wherein AdBlue® is an ultrapure reducing agent for so-called SCR catalyst systems (SCR=selective catalytic reduction). Therefore, a heating option for the media line or at least parts thereof and the plug connections is usually provided, so as to prevent the media therein from freezing or enable their thawing. In order to provide outer insulation and protect against damage, media lines and plug connections, including various transition regions between the latter and first connection regions for hooking up the media line, can exhibit insulating and protective covers.

For example, such an insulating and protective cover in the area of the plug connections of a media line is known in the form of an outer encapsulation from EP 1 985 908 A1. Providing the outer encapsulation to envelop the plug connection in an insulating manner makes it possible to include a volume of air between the latter and the outer encapsulation, which permits a thermal insulation. Such an encapsulation or insulating cover only insulates part of the distance traversed by a medium through a media line encompassing at least one plug connection. In addition, since these transition regions are not insulated, the medium can freeze or frozen locations can become difficult to thaw precisely in the transition region from the one plug connection to the other plug connection joined with the latter, wherein in particular the connector part on the one plug connection and the coupling part on the other intermesh.

In order to prevent this freezing and difficulty thawing, DE 10 2010 035 028 A1 proposes that the outer encapsulation of the plug connection be designed in such a way that both connection regions of the latter also be covered by the encapsulation, so as to thereby also insulate the second connection region, for example one used to hook up a motor vehicle aggregate, and the latter. The first connection region can be provided with a retaining element, which engages the connector part of the adjacent plug connection and retains the latter in the coupling part on which it is situated. While lengthening the insulating cover or encapsulation so as to also cover a connector part in the transition region between two insulating covers of two interconnected plug connections does basically prove advantageous, it cannot be done without a higher outlay, since the plug connections must be designed accordingly. Furthermore, this cannot automatically be done for any line configuration. For example, while the so-called overplugging region in SCR systems is comparatively large, a gap still remains between the encapsulation of two adjacent, intermeshed connecting and coupling parts of two plug connections after the spring back, through which cold can penetrate and cause the medium flowing therein to freeze. The connection between two plug connections in SCR lines or SCR line systems is established by plugging the coupling part onto the connector part or conversely the connector part into the coupling part. A retaining clamp of the coupling part here engages behind a protruding collar of an SAE connecting contour (SAE J2044) of the connector part. The coupling part is plugged onto the SAE connector part until it hits a stop, a process referred to as pushing over. The retaining clamp of the coupling part here latches behind the collar of the connector part. Pulling back the coupling part against the connector direction causes the retaining clamp to reach a locked position, in which the coupling part can no longer be detached from the connector part without releasing the retaining clamp. In order to mate, i.e., push the coupling part onto/over the SAE connector part until it hits the stop, and be able to latch the retaining clamp behind the collar of the connector part, a sufficient length must be provided for the connector part on the side remote from the coupling part behind the collar situated thereon. Since the coupling part is pulled back against the connector direction for purposes of final positioning in the locking position, a relatively large distance remains between the front side of the coupling part and a front side of a flange of the connector part or an encapsulation covering the latter. This intermediate region or transition region on the connector part is correspondingly not insulated, so that the medium flowing through the latter can become frozen in this transition region. Given multipart lines with several line parts put together in a corresponding manner, it may happen that this problem is not encountered at every junction between two line parts, but rather only partially, in particular at locations situated remotely from a heat supply, i.e., in particular remotely from an engine of a vehicle, at a location inside the vehicle or on the vehicle, which is highly exposed to the ambient temperature or airstream while a vehicle is moving or standing idle, for example when arranged under or in the vehicle floor. The necessity of performing an overplugging so as to latch the retaining clamp, i.e., to completely join the coupling part and connector part together, requires that an inexpensive and simultaneously effective insulation here be provided to prevent the medium from freezing in this transition region.

SUMMARY OF THE INVENTION

Therefore, the object of the present invention is to provide a multipart line, in which the transition regions or overplugging regions between the connector assemblies in which no heating by the motor of the vehicle or other heat sources takes place are provided with an insulation that enables an inexpensive and simultaneously effective insulation of the transition region while a vehicle is operating or standing still, and is protected against an unintentional or inadvertent removal.

The object of the invention is solved for a multipart line comprising an end side of a second line part provided with a second connector assembly with at least one retaining element, wherein a connector part of a first connector assembly of a first line part and a coupling part of the second connector assembly of a second line part are connectable or connected to each other by pushing over and locking the at least one retaining element by having the overplugging region of the connector part of the connector assemblies that can be or are connected to each other incorporate at least one insulating element, which is designed as an axially compressible, closed ring that is made out of a material that is slightly heat conducting at least in the outer region of the insulating element and provided with an inner passage opening. The object is solved for an insulating element by having the insulating element as an axially compressible, closed ring be made out of a material that is slightly heat conducting at least in the outer region of the insulating element and provided with an inner passage opening. Further developments of the invention are defined in the dependent claims.

This yields an insulating element for insulating a transition region between line parts that can be or are connected to each other in a overplugging step, which, while joining together the coupling part and connector part in the overplugging step, makes it possible to axially compress two adjacent connector assemblies, while allowing them to expand again after the retaining element has latched, so that the insulating element completely fills out the entire overplugging region, i.e., the entire distance between the front side of a flange of the connector part or the front side of an encapsulation that at least partially envelops the latter and the front side of a flange of the coupling part or retaining element and/or an encapsulation that at least partially envelops the coupling part and retaining element. The line parts of the multipart line and the connector assemblies are completely insulated after the joining process, since the insulating element fills out the gap remaining between the plug connections otherwise insulated on the outside by the encapsulations, i.e., the connector assemblies, or the between the connector assemblies, or the separating point between the connector assemblies, and the line parts are sheathed by at least one sheath. The respective encapsulation enveloping the plug connections from outside can consist or be comprised of shell elements that can be or are connected to each other, and and/or the plug connections can be cast with an insulating compound for generating the outer encapsulation(s). In the following, the paired connectors are those parts that are slotted into each other, i.e., the connector part and coupling part with retaining element, wherein both the connector part and coupling part and potentially also the retaining part are at least partially enveloped by a respective encapsulation. Referred to as the connector assembly are both the combination of connector part and encapsulation at least partially enveloping the latter and the coupling part and encapsulation at least partially enveloping the latter, i.e., the plug connections that are at least partially enveloped by an outer encapsulation.

As a consequence, the insulating element will be accommodated between two axial surfaces that ensure its easy compression in the built-in state. In particular, the system-induced distance between the axial surfaces or overplugging region measures 2 to 5 mm, and is determined by the overplugging path and of course also by component tolerances. However, this distance can be completely covered by the insulating element, and the overplugging region can be filled and completely insulated by the insulating element. This makes it possible to insulate the overplugging region between the paired connectors, in particular against wind, i.e., against convection. Accordingly, the insulating element can be situated between two connector assemblies, i.e., between a plug connection and an encapsulation of the other plug connection or between the two plug connectors or the respective front surfaces of the plug connections and/or their encapsulations.

In the latching position of the coupling part and connector part, in which the retaining element engages behind the protruding collar of the connector part, the insulating element is advantageously slightly compressed and accommodated in the overplugging region, so as to be able to ensure a secure hold, and hence an optimal insulation, of the overplugging region, and thus of the connector part, in this region. In the built-in state, the insulating element lies compressed between two axial surfaces of the adjacent connector assemblies. In particular, it is located against or on a step or stop of the encapsulation and/or plug connection. The compression or pressing can be achieved by having the (axial) height of the insulating element be oversized by comparison to the length of the overplugging region along the connector part, so that the strong compression exerted on the insulating element in the overplugging step does diminish during the final positioning and latching of the retaining element, but a slight compression is also present in the built-in state of the insulating element. This slight compression in the latched state of the retaining element on the connector part of the adjacent connector assembly makes it possible to achieve the desired insulation on the one hand, along with a seal toward the outside for the overplugging region.

In order to prevent heat from being conducted through the insulating element on its exterior side, at least its outer region consists of a sparingly heat conducting material. In particular, the insulating element can consist of only one material. To bring about compressibility, the design at least partially involves a compressible material, advantageously at least partially involves at least one foam material. It is particularly advantageous to use a closed-cell foam material with respect to the pores. Particularly well suited is an elastomer material, such as a foamed elastomer, e.g., a closed-cell cellular rubber, a thermoplastic elastomer, silicone-based materials or even EPDM, i.e., an ethylene-propylene-diene monomer. For example, use can also be made of HNBR, i.e., a hydrated acrylonitrile butadiene rubber and/or CR-NBR, i.e., polychloroprene-nitrile rubber. The degree of foaming of the foam material, i.e., the bulk density prior to compression, can measure 0.05 kg/dm$^3$ to 0.5 kg/dm$^3$, for example, preferably less than 0.15 kg/dm$^3$. When in the built-in state and, after putting together the coupling part and connector part of the adjacent connector assembly of two adjacent line parts, in the compressed state, the insulating element can be compressed by 5 to 30% relative to the uncompressed state. After the joining process, the insulating element lies axially compressed in a gap between the connector assemblies or paired connectors. The insulating element exhibits a first axial height $s_0$ in an uncompressed initial state, a second axial height $s_1$ while being pushed over and intensively compressed, and a third axial height $s_2$ in the final assembly position while exposed to a lower compression by comparison, wherein $s_0 < s_2 < s_1$, and wherein $s_0$ is greater than the gap width $s_{Sp}$. Accordingly, the latter essentially corresponds to the third axial height $s_2$ of the completely assembled insulating element.

It proves especially advantageous for the insulating element to consist not just of one material, but in particular of two layers of varying materials. An inner and outer layer can here be provided, wherein the inner layer is heat conducting, and the outer layer insulating in design. This makes it possible to design the insulating element to be especially well insulating on the one hand, and heat conducting on the other. The heat conducting material used for the inner layer does not absolutely have to be compressible, as long as it is not or does not become positioned between the axial surfaces of the connector assemblies that compress the insulating element during the overplugging step in the process of joining the paired connectors and in the end position of the insulating element.

If the connector assemblies arranged adjacent to the insulating element, in particular the intermeshing connector parts and coupling parts, are heat conducting in design, and if the latter consist at least partially of a heat conducting material, then it is advantageous to also make the insulating element heat conducting in design, so that heat can be conducted through the latter. If the insulating element has a multilayer structure, the inner layer can be designed as an aluminum layer or aluminum lamination of the outer layer, for example, and/or take the form of a heat conducting sleeve, in particular a metal bushing, in particular a stainless steel bushing. Providing an aluminum layer or aluminum lamination as the inner layer furnishes a heat conducting layer that allows heat to be conducted between the paired connectors. At the same time, an outer insulation is achieved by the foam material of the outer layer. Providing a heat conducting bushing or metal bushing establishes a base upon which the foam layer can be easily applied as an outer layer.

Advantageously providing a closed ring shape for the insulating element can prevent the insulating element from inadvertently falling off the connector part, even if it ages and/or becomes contaminated. Rather, it is axially inserted onto the connector part, and positioned behind the collar arranged thereon between the latter and a flange of the connector part or a front side of an encapsulation at least partially enveloping the latter. Providing the ring-shaped insulating element between the collar and flange of the connector part or front side of an encapsulation enveloping the latter can reliably prevent the connector assembly from inadvertently falling off.

Providing the ring-shaped insulating element makes it possible at any time to operate the retaining element, since it is not covered by the insulating element. In addition, the insulating element creates an insulating cover for the overplugging region that is much less expensive than the design of the encapsulation according to DE 10 2010 035 028 A1, and permits an even better insulation by comparison thereto.

After inserted onto the connector part, the ring-shaped insulation exhibits a clearance toward the outside of the connector part at least in the overplugging region, i.e., in the region between its collar and its flange or the front side of an encapsulation inserted thereon. This enables a particularly good insulating effect, since air is included between the insulating element interior and connector part surface, and can help insulate. The clearance or distance can also only be established in the compressed receptacle between the axial surfaces of the connector part and coupling part or retaining element, or of an encapsulation enveloping the connector part and an encapsulation enveloping the coupling part and potentially also the retaining element.

In order to further improve the insulating effect, at least one recess and/or opening can be provided in the region of the inner ring opening so as to include air. The recess and/or opening can exhibit any shape, for example several circle segment-shaped recesses can be provided in the region around the inner ring opening. As a result, air can additionally be included in a targeted manner at only a few locations, so as to partially provide especially good insulation.

In particular before mounting the connector part on the coupling part, a fixing device can be provided to retain the insulating element on the connector part. For example, such a fixing device can be slipped onto the end of the connector part up to the collar or even the insulating element. Providing an outer diameter of the fixing element that is greater than the inner diameter of the ring-shaped insulating element makes it possible to fix the insulating element on the connector part. It is also possible to provide a cap-shaped cover for securing the insulating element on the connector part, which is inserted onto the connector part end prior to assembly of the connector part, and whose end side is provided with a protruding element, in particular a protruding end plate having a greater diameter than the inner diameter of the ring-shaped insulating element. This also makes it possible to prevent the insulating element from inadvertently falling from the connector part.

The ring-shaped insulating element can further advantageously exhibit an essentially round and/or polygonal outer shaping, in particular a polygonal shaping with rounded corner regions. The outer and inner shaping of the insulating element can be made to depend on the respective application or installation situation in the environment of the insulating element.

For example, the diameter of the inner passage opening of the insulating element can measure 3 to 6 mm, in particular 4 mm. For example, the wall thickness of the insulating element can measure 2 to 7 mm, in particular 3 mm.

Means can be furnished for fastening the insulating element to the connector assembly, i.e., the plug connection and/or an encapsulation provided on the outside that at least partially cover the latter, in particular a positive connection and/or frictional connection and/or material bond and/or at least one fixing element, in particular in the form of a cap that can be or is inserted/plugged onto the connector part of the plug connection, as already described above, and/or a flange-like latching projection, and/or fastening via adhesive bonding. Instead of merely inserting the insulating element onto the connector part and arranging the latter between the flange and collar of the connector part, the insulating element can be fastened to the plug connection and/or the encapsulation that at least partially envelops the latter. Fastening can take place via positive connection and/or frictional connection and/or material bonding. Therefore, one option is to arrange the insulating element on at least one axial step of the encapsulation and/or the plug connection. The plug connection and/or the encapsulation enveloping the latter can be provided with at least one axial support surface for supporting and axially bracing the insulating element. This not just fixes the insulating element in its position on the connector assembly at the outset, but even during compression also allocates to it a defined supporting surface on the plug connection or its encapsulation, against which the insulating element can optimally abut.

The line side of a media line situated by a heat source, such as a vehicle engine, can be exposed to high temperatures of 120° to 140° C., and to a temperature of up to 220° C. for a brief period, for example up to 15 minutes. Therefore, the multipart line can exhibit two line parts, of which one consists of a high temperature-resistant material, and the other consists of a less temperature-resistant material by comparison, wherein the insulating element is provided in the connecting region between the two line parts. This makes it possible to satisfy the requirement of a high temperature resistance for the line in proximity to the heat source, while at the same time not having to make the entire line out of a high temperature-resistant material, which is expensive. If sensible or necessary, the multipart line can exhibit three line parts, of which one consists of a high temperature-resistant material, and the two other line parts consist of material that is less temperature-resistant by comparison, wherein a respective insulating element is arranged in the two connecting regions between the line parts.

Only one insulating element is usually required for each fluidic separating point. A fluidic separating point is a separating point in which a connector assembly on which the insulating element can be applied is provided, for example a plug connection between two line parts or also between one line part and an aggregate. When using two connector parts, also referred to as male SAE's, to join together two connector assemblies, use is advantageously made of two insulating elements, one respective insulating element per connector assembly, since an uninsulated gap would otherwise remain on the latter after the connecting process. For example, one to two fluidic separating points can be provided per media line, and furnished with an insulating element based on their positioning. As already mentioned, the insulating element is advantageously used at separating points in a vehicle that are exposed to the airstream or convection. Of course, use in other locations not directly exposed to the airstream is also possible, and beneficial with respect to thermal insulation.

The outside of the insulating element can exhibit an apron element, in particular in the form of a curtain-like element made out of a rubber material. For example, the apron element can be used to at least partially cover and shield the retaining element against wind, so that additional insulation can also be provided in the region of the retaining element by providing the insulating element with an apron element. It can further be preassembled on the plug connection or connector assembly. In this case, the insulating element is thus not preassembled to the connector part, but to the coupling part. It is also easy to put together and push or plug over the connector part and coupling part, wherein the fluidic connecting point is optimally insulated after the connecting process has concluded.

For example, the apron element can be or is injection molded as an outer edge of the insulating element in the form of a cup. After the assembly of the insulating element and its final positioning between the connector assemblies, the apron element can be folded over, for example so as to cover, and thereby insulate, additional possible air inlet locations, such as in the region of the retaining element. In a special configuration, the apron element can here extend over only ¾ of the periphery of the insulating element, for example, and correspondingly over only ¾ of the periphery of the retaining element, for example, and only in the region that would allow the undesired entry of air. By comparison to forming the apron element around the entire insulating element, this facilitates assembly, since the process of folding over and positioning in particular on the retaining element and later disassembling the plug connection is made significantly easier.

In selecting the material for the insulating element, it is possible for the material to be not just compressible, but also expandable. Even given an axial movement of the media line provided with at least one insulating element, this enables and ensures a durable abutment, i.e., a frictional connection, on the end faces of the connector part of the one connector assembly and the coupling part of the other connector assembly or on the encapsulations that correspondingly at least partially envelop the latter. While mounting the insulating element on the connector part, the use of an expandable material makes it possible to surmount the collar of the latter or the latching mechanism behind which the retaining element engages free of damage, without an air gap subsequently being left behind between the ring-shaped insulating element and upper side of the connector part at the positioning location of the insulating element.

Provided the latter is to be specifically provided, this can of course also be done for an expandable material.

In particular, the insulating element can be dyed, for example in the color black, which exhibits the highest UV resistance. Of course, other colors can also be used. Dying the insulating element further provides a labeling or color coding function for the different lines. This proves advantageous in being able to quickly and clearly find the right connector assembly, not just at the fluidic separating points, but also when using several connector assemblies, e.g., in the area of a vehicle tank or metering pump, which are designed with the same size or dimensions.

Instead of using a closed, ring-shaped insulating element, the latter can also be designed with a separating point, in particular configured as a slotted or C-shaped insulating element. This enables the assembly of the insulating element even after the paired connectors or connector assemblies have been connected in the region of the fluidic separating point, which is no longer the case given a closed ring-shaped design.

If the insulating element has already been fastened to at least one connector assembly prior to the delivery of a media line to a customer, the dirt plug usually inserted onto the connector part on the end side anyway can be used as a fixing device, and hence as an anti-loss safeguard, so as to protect it and secure the insulating element on the connector part until it is put together with a coupling part. Depending on the configuration of the ring-shaped insulating element, however, it also holds itself in place behind the collar of the connector part, thereby eliminating the need for further fixation before the connector part is put together with the coupling part. If an especially reliable fixation is to be provided, one side of the insulating element can be secured to a connector assembly, for example via adhesive bonding or insertion on a projection furnished there. To this end, the insulating element can already be provided with an adhesive surface protected by a protective film, which is used for adhesive bonding to the connector assembly after it has been mounted thereto. The adhesive surface is provided on the face of the insulating element, so that adhesive bonding on the front or face also takes place on the connector assembly, in particular its encapsulation. It is further also possible to injection mold the insulating element to the connector part or coupling part during their manufacture. This makes it possible to secure the insulating element to the connector part or coupling part especially well.

As already mentioned, the media line can not only be designed in two parts, i.e., exhibit two line parts that can or are connected to each other via a fluidic separating point with respective connector assemblies, but also as a three- or multipart media line or heatable media line. As systems become more simplified, the dosing point with dosing module in vehicles is increasingly displaced in the direction of the vehicle engine block. As a result, it proves advantageous to divide the heatable media line into different line parts that are coupled with each other, specifically via connector assemblies, since a heater can be provided close to the location to be heated in the region of the components hooked up to the heatable media line. A heater is usually provided precisely in the region of a vehicle tank, while the latter is usually not required in the region of the engine block. The region of a vehicle tank is usually provided with a heated media line or an insulating element, while sufficient heat is usually generated by the exhaust gas and engine in the direction of a dosing point of an injection device, i.e., near the exhaust gas system or engine, so that an insulating element does not absolutely have to be provided there. The radiated heat present there is often already sufficient for heating the medium flowing through the heatable media line, i.e., in particular for thawing the medium given low ambient temperatures outside of the vehicle, so that the medium rarely freezes there even at the fluidic separating points.

In the region of a dosing point of an injection device or in the region of an engine block, use is often made a high temperature-resistant line or high temperature-resistant line part, which is comparatively expensive due to the use of the high temperature-resistant material. In order to keep the costs as low as possible, it is further common to provide a standard line or a line part that consists of a considerably less expensive material, but is less temperature-resistant, far enough away from the heat sources of the dosing point or engine block. A connector assembly is also usually used for joining together the two line parts, wherein it can be provided with at least one insulating element.

The connector part, in particular the SAE male, often consists of a plastic material. Given an insulating element designed with at least two layers, it thus proves advantageous to either use the already mentioned heat conducting bushing as the inner layer of the insulating element, or a heat conductive plastic, for example, the outside of which is injection molded or enveloped with compressible material, in particular foam material.

Depending on whether the media line is configured as a one- or multipart media line and depending on the heat required for heating the individual line parts of the media line, a varying number of heating elements or braids can be used for heating the line parts and conductor assemblies. For example, use can be made of just one heating element, a twin braid or a quadruple braid. The number of provided heating elements can be varied per used line part, as can the number of used insulating elements. For example, one insulating element will be sufficient given a combination of a high temperature-resistant line part and a line part made out of a standard material, while using two insulating elements proves advantageous when using a high temperature-resistant line part in combination with two additional line parts consisting of a standard material that is less temperature-resistant.

When using at least one two-layer insulating element, it is further possible to give the inner layer or an inner layer a higher foaming degree than the or one outer layer. This enables a very good compressibility precisely in the outer region, and a very good fit on the connector part of the corresponding connector assembly in the inner region.

The region of the fluidic separating point after the connector part and coupling part of two adjacent line parts or connector assemblies have been completely joined together exhibits a gap or distance between the adjacent axial surfaces of the connector part and coupling part or its outer encapsulations that measures 5 mm+1-2 mm. It therefore proves advantageous to provide the insulating element with an axial height that exceeds that to some extent, so as to enable compression.

By compressing the insulating element in its final position at the fluidic separating point between the two adjacent connector assemblies during attachment via the fluidic separating point in the region of the connector part, water can be prevented from penetrating from the outside in the direction of the connector part that carries the flow of medium. Penetrating water would otherwise require that the latter be thawed as well, and, given any doubt while turning off the vehicle or through exposure to low ambient temperatures, would in turn also freeze, i.e., could no longer be removed from the fluidic separating point. This would give rise to the permanent risk that an at least thin-walled ice shield would form around the connector part. This risk can be significantly reduced or eliminated entirely by providing the insulating element.

With regard to the differentiated power coupling given a multipart design of the media line, the material of the line must also be considered in terms of heating the individual line parts. A line part that consists of a temperature-resistant material, in particular plastic, and is thus suitable for higher ambient temperatures, for example in the region of the dosing point of an injection device in a vehicle, can of course be exposed to more power than a line part consisting of a standard material, in which design limits relating to thermal capacity must be considered. Mass or standard plastics are plastics that can be used at a continuous service temperature of up to 90° C., technical plastics are plastics that can be used at a continuous service temperature of up to 140°, and high-performance plastics are those that can be used at a continuous service temperature in excess of 140° C. At higher ambient temperatures, for example, a temperature-resistant plastic material, such as PPA (polyphthalamide), i.e., a polymer, in particular high-temperature polyphthalamide (HT-PPA), is suitable for designing a plug connection or a line part in this region, while in the cooler region, i.e., in the region of the vehicle not heated by heat sources, such as the engine block or injection system, polyamide PA12 is suitable for the line part, and also for the plug connection there, as is polyamide PA6. Polyamides other than PA12 and PA6 are also suitable, such as PA66, PA11, PA612 or polyether block amides (PEBA). Given line parts with a tubular design, for example, ethylene-propylene-diene rubber (EPDM) is suitable for higher ambient temperatures given a temperature load of up to 170° C., potentially in combination with a plug connection made out of PPA. The used elastomers can also include hydrated acrylonitrile butadiene rubber (HNBR), an ethylene-propylene rubber (EPM) for a temperature load exceeding 200° C., or also a thermoplastic elastomer (TPE). Suitable apart from the aforementioned as high temperature-resistant plastics, i.e., high performance plastics, are the following: Polytetrafluoroethylene (PTFE), polyvinylidene fluoride (PVDF), polybutylene terephthalate (PBT), polysulfones (PSU), polyaryletherketones (PAEK), polyphenylene sulfides (PPS) and polyimides (PI) along with various copolymers, which together all contain the smallest repeating chain structure units of the aforementioned compounds. Use can further be made of fluoropolymers, such as polytetrafluoroethylene (PTFE), ethylene-tetrafluoroethylene (ETFE), perfluoroethylene propylene (FEP), poly arylene ether ketones (PEAK), such as polyphenylene, e.g., poly[di-(oxy-1,4-phenylene) carbonyl-1,4-phenylene] (polyetheretherketone, PEEK), poly[oxy-1,4-phenyleneoxy-di-(1,4-phenylenecarbonyl-1, 4-phenylene] (polyetheretherketone ketone, PEEKK) or poly[oxy-1,4-phenylenecarbonyl-1,4-phenyleneoxy-di-(1, 4-phenylenecarbonyl)-1,4-phenylene] (polyetherketone ether ketone, PEKEKK), or also polyarylene sulfides, such as polyphenylene sulfide (PPS). The material PTFE exhibits the highest thermal resistance.

In particular polyethylene (PE), polypropylene (PP), polyvinylchloride (PVC) and polystyrene (PS) can be used as mass plastics. Where appropriate, technical plastic can be used for line parts, such as polymethacrylic acid methyl ester (PMMA), polyamide (PA), polyethylene terephthalate (PET), polycarbonate (PC), acrylonitrile-butadiene-styrene (ABS) or polyoxymethylene (POM).

When dosing close to the engine, it proves advantageous to provide a two-part media line, specifically a dosing line part comprised of a high temperature-resistant material and a tank line part made out of a material suitable only for lower ambient temperatures or a standard material. When dosing does not take place close to the engine and no peak thermal loads are encountered, a two-part media line can also be used, wherein both line parts, specifically the dosing line part and tank line part, can consist of a standard material, i.e., a material that is not high temperature-resistant. When dosing close to the engine, a three-part media line can further be provided, which exhibits a dosing line part comprised of a high temperature-resistant material, an intermediate line part made out of a standard material, and a tank line part also made out of a standard material, wherein the standard material of both line parts does not have to be identical, but is less temperature-resistant than the material of the dosing line part. In a three-part design in which dosing does not take place close to the engine, meaning that there is no peak thermal load for one of the line parts, all three line parts, specifically the dosing line part, intermediate line part and tank line part, can each consist of a standard material, wherein the same materials also need not be used here either, so that different materials can instead be provided for the individual line parts, but do not have to be high temperature-resistant. Providing the insulating element as a thermal decoupling element proves advantageous precisely given two line parts made out of a standard material, since there is a risk that the medium flowing through the fluidic separating points will freeze at or on the fluidic separating points due to the lower power coupling or less available heating capacity. The heating elements extending along the line parts made out of standard materials or also the plug connections or connector assemblies made out of standard material for heating these line parts and plug connections only provide less heating capacity than the exhaust heat in the dosing region close to the engine.

BRIEF DESCRIPTION OF THE DRAWINGS

To more precisely explain the invention, exemplary embodiments thereof will be described below in more detail based on the drawings. The latter show:

FIG. 2a a perspective exploded view of a combination of the insulating element according to the invention with the two paired connectors according to FIG. 1a;

FIG. 2b a perspective view of the two put together paired connectors according to FIG. 2a and the inventive insulating element according to FIG. 2a;

FIG. 9 a front view of a connector assembly with connector part and outer encapsulation;

FIG. 10 a top view of another embodiment of an insulating element according to the invention in a rectangular configuration, which fits the axial contact surface on the encapsulation according to FIG. 9;

FIG. 11 a side sectional view of an insulating element according to the invention that is radially pressed onto a connector part;

FIG. 12 a side cross sectional view of an insulating element according to the invention, which is arranged on a connector part with clearance;

FIG. 13 a side cross sectional view of another embodiment of an insulating element according to the invention with a multilayer structure;

DETAILED DESCRIPTION OF THE INVENTION

Figure 1A:
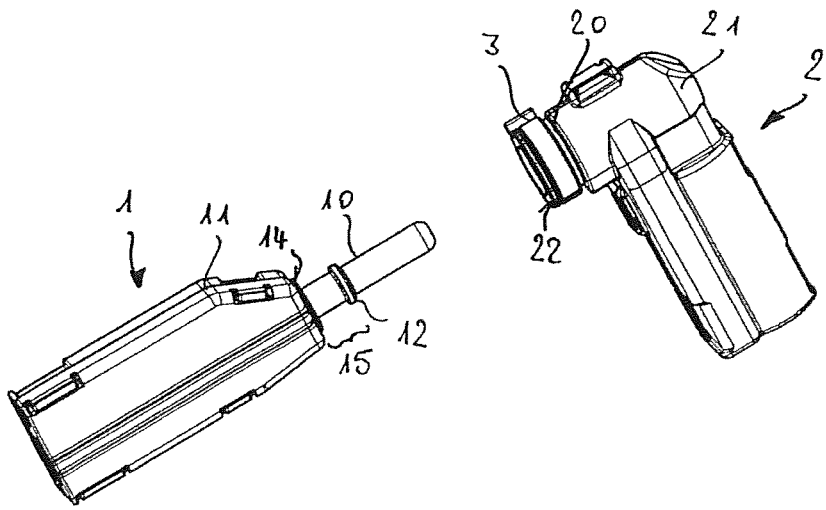
FIG. 1a a perspective view of two connector assemblies, of which one exhibits a connector part and the other a coupling part with a retaining element, wherein both are provided with an outer encapsulation.
Figure 1B:
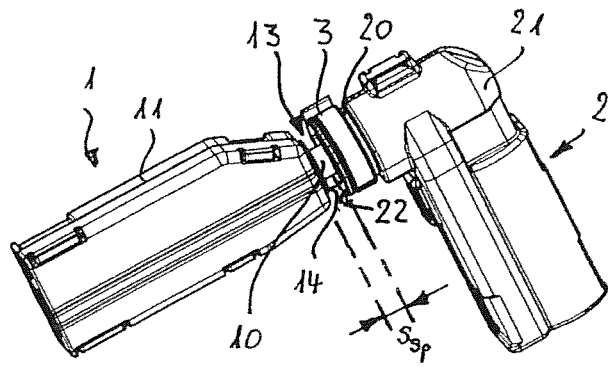
FIG. 1b a perspective view of the two paired connectors according FIG. 1a after put together, with an uninsulated gap remaining in the region of the connector part.
Figure 2A:
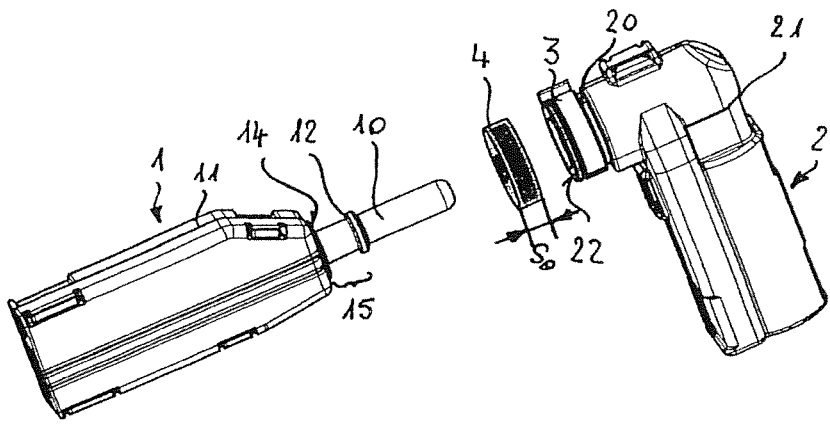
Figure 2B:
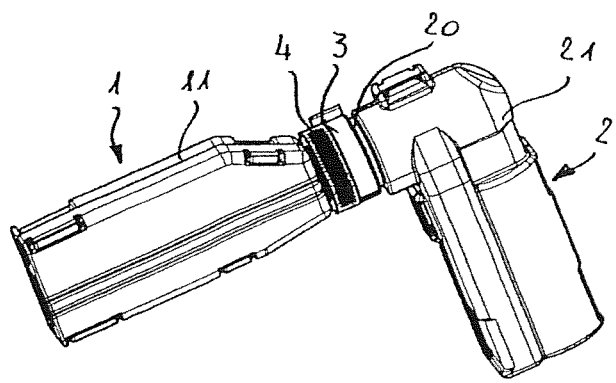

FIGS. 1a and 1b show two paired connectors in the form of two connector assemblies 1, 2, wherein the first connector assembly 1 is provided as a straight plug connection with a connector part 10 configured as an SAE male and an outer encapsulation 11. The second connector assembly 2 is designed as a right angle plug connection, and encompasses a coupling part 20 provided with a retaining element 3, and also exhibits an outer encapsulation 21. The outer encapsulation 21 does not extend over the entire retaining element 3, as evident in particular from FIG. 1a. FIG. 1b shows both connector assemblies 1, 2 after put together, wherein the latter are put together in a so-called overplugging step. The coupling part is here inserted onto the connector part until it hits a stop, wherein the retaining element latches behind a protruding collar 12 of the connector part 10. Pulling the coupling part 20 in a direction away from the connector part 10, i.e., opposite the mating direction, causes the retaining element to move into a locking position in relation to the protruding collar 12. In the locking position, the coupling part can no longer be removed from the connector part without releasing the retaining element. In this final position of the connector part and coupling part depicted on FIG. 1b, a relatively large distance or gap 13 with a gap width of $s_{Sp}$ remains between the front side 22 of the coupling part 20 and the front side 14 of the outer encapsulation 11 of the first plug connection. Depending on where this gap 13 is arranged in a vehicle as depicted on FIG. 22, e.g., in the region of the underbody or side member of the vehicle, the medium flowing through the connector part 10 and coupling part 20 can freeze in the region of the gap 13, e.g., when exposed to wind or convection. In order to provide insulation here, an insulating element 4 is situated in the gap 13, as shown on FIG. 2b in the mounted position or on FIG. 2a prior to mounting. In the completely mounted final state, the insulating element 4 abuts against the encapsulation 1 on its face or front side 14, there in particular against a provided step, and on the face or front side 22 of the coupling part, there in particular against a stop or step.

Figure 3:
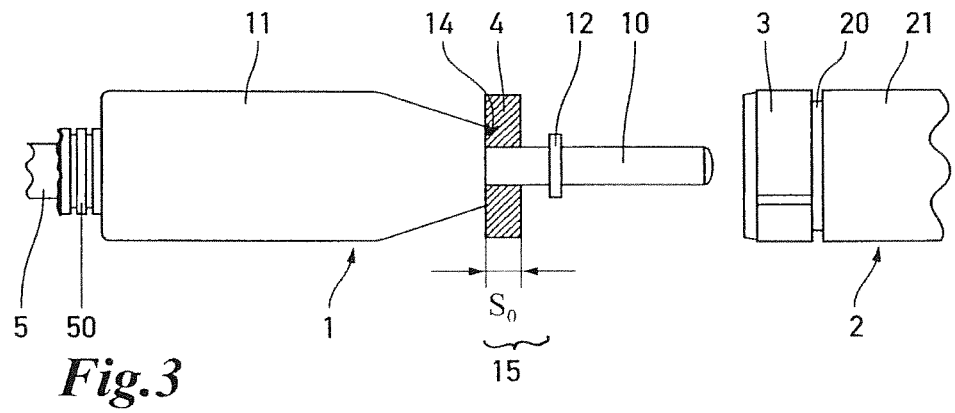
FIG. 3 a detailed view in a schematic sketch of a connector module provided with the insulating element according to the invention on the connector part and a coupling part with a retaining element of a second connector assembly as positioned before putting together the connector part and coupling part.
Figure 4:
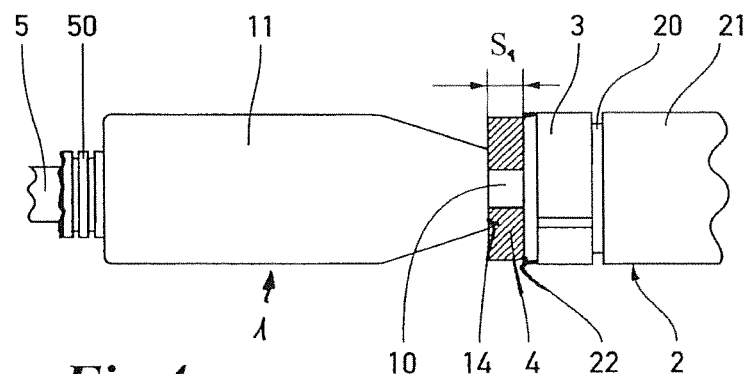
FIG. 4 a side, partially sectional view of the paired connectors according to FIG. 3 in the overplugging position, in which the insulating element according to FIG. 3 is highly compressed.
Figure 5:
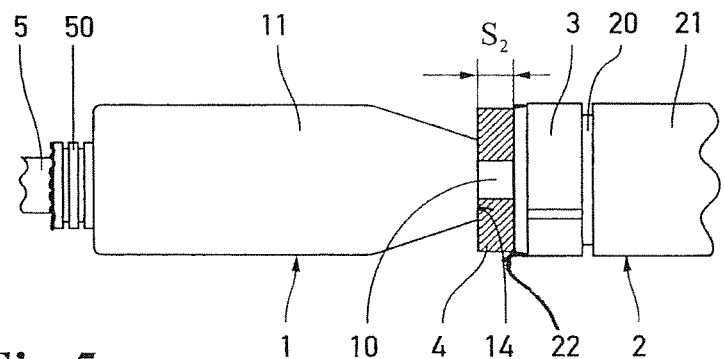
FIG. 5 a side, partially sectional view of the paired connectors according to FIG. 3, wherein the latter have sprung back into the connected end position, and the insulating element is less compressed by comparison to the overplugging position on FIG. 4.
Figure 6:
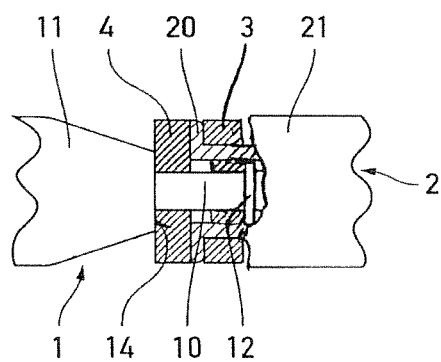
FIG. 6 a partially sectional view of the end position of the insulating element, connector part, coupling part and retaining element according to FIG. 5.

The insulating element 4 is ring-shaped in design, as more clearly evident from FIGS. 3 to 5, which show the individual steps involved in putting together the two paired connectors of the connector part 10 and coupling part 20 with retaining element 3. FIG. 6 presents a sectional view of the final position after the connector part 10 with insulating element 4 and coupling part 20 with retaining element 3 have been put together. As may be gleaned from FIG. 3, which shows the first connector assembly 1 with a portion of a media line connected thereto, specifically a line part 5 outwardly enveloped by a corrugated pipe or sheath 50, the insulating element 4 is already situated in a overplugging region 15 of the connector part 10 that extends between the protruding collar 12 and the front side 14 of the outer encapsulation 11. The insulating element 4 exhibits a lesser height $s_0$ than corresponds to the width of the overplugging region 15, but a greater axial height $s_0$ than would correspond to the gap width $s_{Sp}$, so that $s_0 > s_{Sp}$. As indicated on FIG. 14, the insulating element 4 can also extend over the entire width of the overplugging region 15. FIG. 4 presents the overplugging step for the connector part and coupling part with retaining element. The insulating element 4 is highly compressed in this step. The height $s_1$ while intensively compressing the insulating element 4 during the overplugging step is less than the original height $s_0$ of the insulating element 4 and denoted on FIG. 3. FIG. 5 shows the final assembly position of the connector part with insulating element and coupling part with retaining element. The insulating element 4 is less intensively compressed in this final assembly position than during the overplugging process, but still continues to be slightly compressed, and correspondingly exhibits a level of $s_2$, wherein $s_0 < s_2 < s_1$ and $s_2$ with the insulating element 4 in the slightly compressed, final assembly position corresponds to the gap width $s_{Sp}$, so that the gap is completely filled. As a consequence, the insulating element 4 is compressively braced or pressed between the coupling part 20 and outer encapsulation 11 of the connector part 10, and thereby held fast. This may also be derived from the partial sectional view of the detail of the connector part with insulating element and coupling part with retaining element according to FIG. 6, wherein it is evident that the front side 22 of the coupling part 20 axially abuts on its face against the one side of the insulating element 4, and the axial front side 14 of the outer encapsulation 11 of the connector part 10 or first connector assembly 1 oppositely axially abuts on its face against the insulating element 11, so that the insulating element 11 is arranged between two axial surfaces of the adjacent connector assemblies 1, 2.

Figure 7:
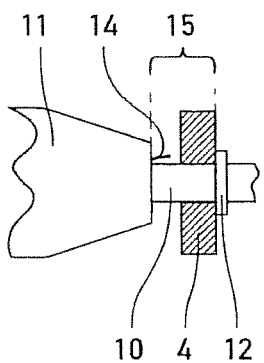
FIG. 7 a partially cut detailed view of an insulating element according to the invention as mounted between a collar of a connector part of a connector assembly and a front side of an outer encapsulation of the connector part.
Figure 8:
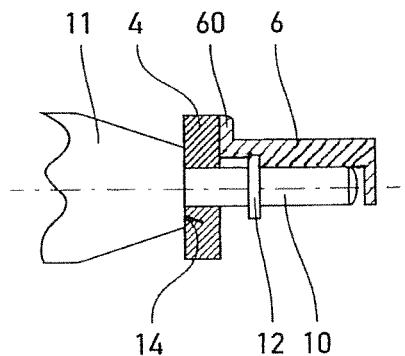
FIG. 8 a side, partially sectional view of an insulating element mounted onto a connector part, wherein the insulating element is secured onto the connector part by a sealing cap.

FIGS. 7 and 8 show respective fixing devices for fixing the insulating element 4 on the connector part 10. This is the protruding collar 12 on FIG. 7, as already visible on FIG. 3, while FIG. 8 provides a sealing cap 6 to further fix the insulating element 4 on the connector part before mounting the connector part on the coupling part. The sealing cap 6 extends around the connector part and protruding collar 12 so as to envelop the latter on all sides, and its end abutting the insulating element 4 exhibits a flange 60, whose face presses against the insulating element 4 and correspondingly holds the latter axially in abutment against the front side 14 of the outer encapsulation 11 of the connector part 10.

The insulating element 4 can be designed with colors, so as to better be able to discern whether the latter is mounted or still missing on the one hand, and in order to also be able to optically label specific connector assemblies about the latter, so that assembly can take place quickly given a multipart media line.

FIGS. 10 to 19 show various embodiments of the insulating element 4. FIG. 9 presents a top view of the front side 14 of the outer encapsulation 11 of the connector assembly 1, which represents the axial contact surface for the insulating element, and offers a defined axial abutment and support during compression. As evident from the figure, this contact surface, i.e., the front surface 14 of the outer encapsulation 11, is approximately rectangular in design with rounded corners, so that it proves advantageous to also design the insulating element 4 based on the shape, as denoted on FIG. 10. The top view here also shows an approximately rectangular shape with rounded corners as a deviation from a round ring shape. Nevertheless, the insulating element exhibits a ring shape, i.e., is designed as a closed ring with an inner passage opening 42 having an opening diameter d of 3 to 6 mm, for example, so that axial positioning can take place on the connector part 10. It is basically also possible to design the insulating element 4 with a slit or C shape, thereby enabling a radial mounting on the connector part or on an already completely assembled combination of connector part and coupling part. Likewise, it is possible to not pre-mount the insulating element 4 on the connector part, but rather to fasten it to the front side of the coupling part, e.g., via adhesive bonding, so that, in the mating process, the connector part first engages into the latter, after which compression takes place as it also does during preassembly on the connector part.

Figure 14:
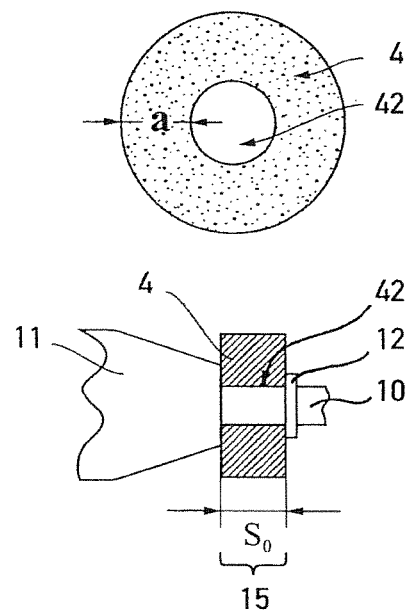
FIG. 14 a top view and side cross sectional view of another embodiment of an insulating element according to the invention, which is designed as a one-layered foam ring.
Figure 15:
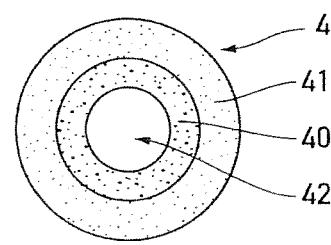
FIG. 15 a top view of a round insulating element according to the invention with a two-layer structure.

FIGS. 14 to 17 present various embodiments of the insulating elements 4 shaped like round rings as viewed from above. Just as the one shown on FIG. 10, the insulating element depicted on FIG. 14 is here made completely out of just one foam material, and exhibits a wall thickness a of 2 to 7 mm, for example. As may be gleaned from the cross sectional view of the insulating element on FIG. 14, the latter extends over the entire overplugging region 15, i.e., exhibits a greater height $s_0$ than the insulating element shown on FIG. 3. As shown on FIG. 15, the insulating element 4 can have a multilayer structure, and exhibit an inner layer 40 and an outer layer 41. Additional layers can also be provided. In the embodiment on FIG. 15, the foaming degree of the inner layer 40 exceeds that of the outer layer 41. This makes it possible to achieve a stronger insulating effect in the inner layer on the one hand, and a greater mechanical stability in the outer layer on the other. FIG. 13 shows a side sectional view of the insulating element 4 according to FIG. 15, wherein FIG. 13 reveals that the more intensively foamed inner layer 40 abuts tightly against the connector part 10 in its overplugging region 15 to strongly insulate the latter, while the outer layer 41 is less intensively foamed and mechanically more stable.

Figure 16:
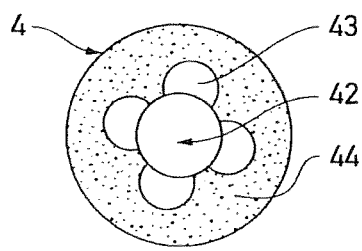
FIG. 16 a top view of a round insulating element according to the invention with recesses or openings arranged in the interior for the inclosing/encasing of air.
Figure 17:
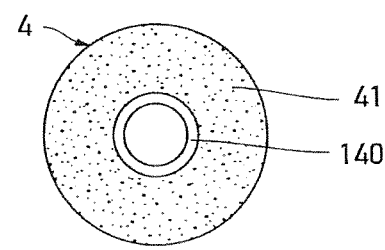
FIG. 17 a top view of another embodiment of a round insulating element according to the invention with aluminum lamination provided in the interior.
Figure 18:
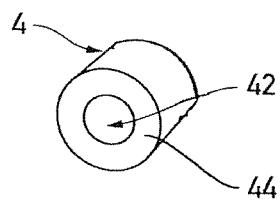
FIG. 18 a perspective view of another embodiment of an insulating element according to the invention made out of a conductive material.
Figure 19:
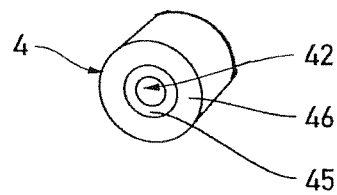
FIG. 19 a perspective view of another embodiment of an insulating element according to the invention with an interior heat conducting bushing.

In the embodiment shown on FIG. 16, recesses 43 are provided in the interior around the central inner opening 42 of the ring-shaped insulating element 4, here four recesses 43, which leave air channels that result in an even better insulation of the connector part or overplugging region 15 in which the insulating element 4 is or will be arranged. Depending on the size of the air space created by providing the recesses 43, the foaming degree selected for the insulating element 4 or for its body 44 can be smaller, or the insulating element body 44 need not be foamed, but provided with compressibility.

Instead of providing the recesses 43, a continuous ring-shaped air gap 48 can be furnished between the insulating element 4 and the outside 16 of the connector part in the overplugging region 15. As a consequence, the insulating element 4 in the embodiment shown on FIG. 12 is applied to the connector part 10 with clearance, wherein the resultant air gap 48 exerts an insulating effect. Alternatively, the insulating element 4 can also pressed radially onto the connector part or its outside 16 in the overplugging region 15 without clearance, as denoted on FIG. 11.

As may be gleaned from FIG. 9, the encapsulation 11 of the connector part 21 or coupling part 20 exhibits a two-part shape, for example, in particular consisting of two half shells, as denoted on FIG. 9. Alternatively, the outer encapsulation can be insert molded on all sides. Depending on the selected shape of the outer encapsulation, the insulating element can also be directly splashed onto the latter, or secured thereto, e.g., via adhesive bonding. It is likewise possible to furnish the front side in particular of the outer encapsulation 11, but potentially also of the outer encapsulation 21, with protruding elements serving to accommodate the insulating element, in particular when designing the insulating element with clearance to the outside 16 of the connector part 10, as shown on FIG. 12.

The insulating element 4 can have not just an insulating, but also a heat conducting effect, so that, in particular while fabricating the adjacent connector assemblies 1, 2 or their outer encapsulations 11, 21 or the connector part 10 and coupling part 20 out of a heat-conducting material, heat transfer can be provided between the latter through the insulating element 4. As denoted on FIG. 17, a heat-conducting lamination, for example an aluminum lamination 140, can be provided for this purpose as the inner layer 40 or lamination 140 of the outer layer 41 of the insulating element 4. Alternatively, a heat conducting bushing 45, e.g., made out of stainless steel, can be provided, and enveloped on the outside with a plastic to yield the insulating element 4. The heat conducting bushing 45 and outer plastic layer 46 may be seen on FIG. 19. In addition, the entire body 44 of the insulating element 4 can be comprised of a plastic material that contains heat conducting elements, or of a combination of a conductive plastic material that serves to conduct heat and another plastic material enveloping the latter that does not conduct heat, as denoted on FIG. 10. In the embodiment denoted on FIG. 10, the entire body 44 of the insulating element 4 is heat conducting in design, and consists of a conductive plastic.

Figure 20:
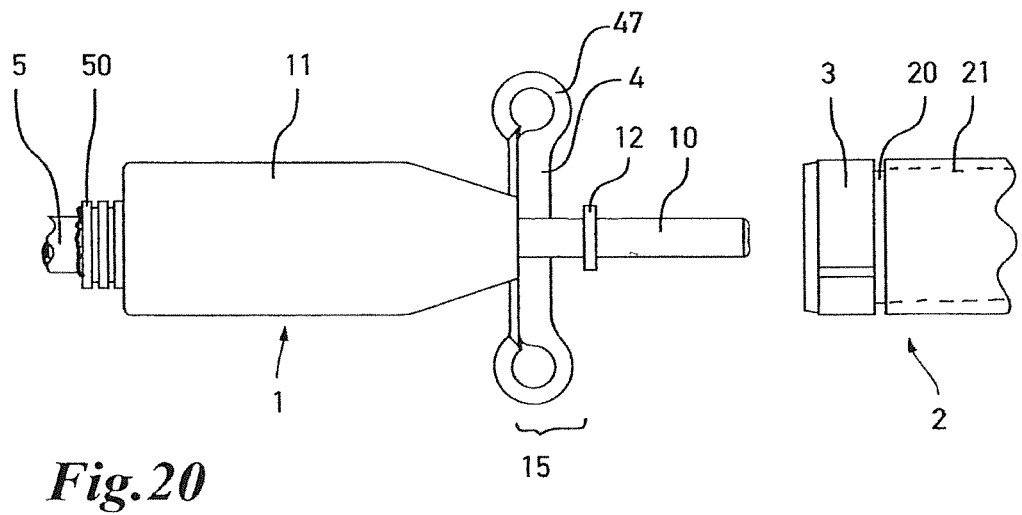
FIG. 20 a side detailed view of two paired connectors in the form of a connector part and coupling part with retaining element, wherein the connector part is provided with an insulating element according to the invention with outer apron element.
Figure 21:
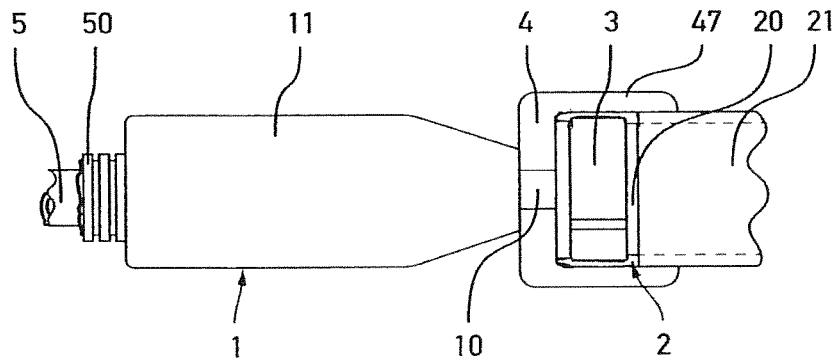
FIG. 21 a side detailed view of the structure according to FIG. 20, wherein the apron element of the insulating element is slipped over the retaining element and a portion of the coupling part.

FIGS. 20 and 21 show another embodiment of the insulating element 4. The latter exhibits a molded-on apron element 47. The latter is depicted rolled up on FIG. 20 after the insulating element 4 was pre-assembled on the connector part 10 or in the overplugging region 15 thereof. After the connector part 10 with insulating element 4 and coupling part 20 with retaining element 3 have been completely put together, the apron element 47 is unrolled to cover the retaining element 3 and a portion of the coupling part 20, as denoted on FIG. 21, and serves to further insulate the latter. In particular, this makes it possible to also outwardly insulate the region of the coupling part 20 arranged outside of the outer encapsulation 21 and provided with the retaining element 3, so that the medium flowing through this region can also be reliably prevented from freezing.

Figure 22:
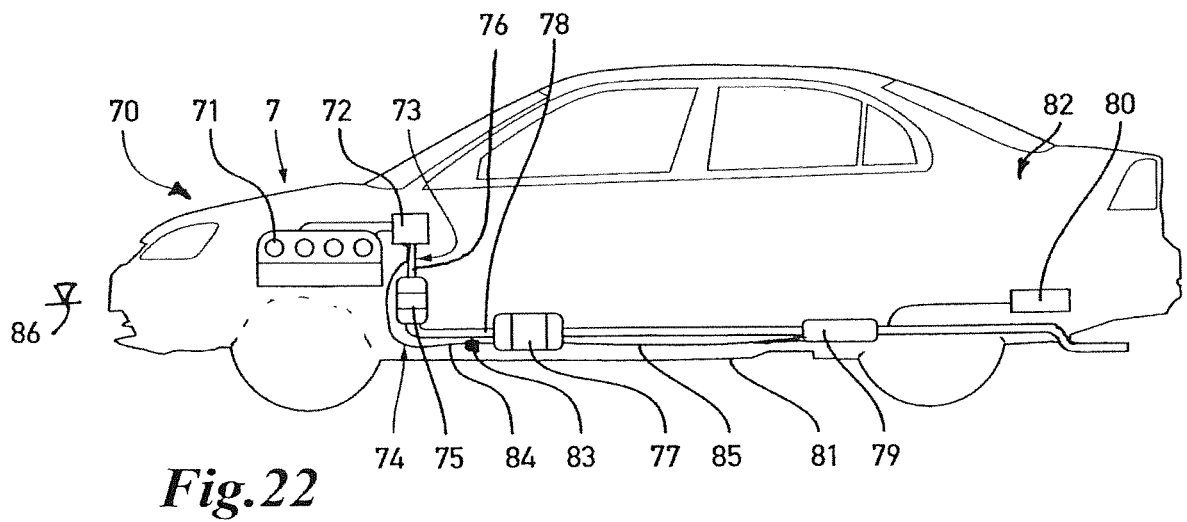
FIG. 22 a schematic sketch of a vehicle with a multipart media line, which extends in the area of the underbody of the vehicle between an engine block with turbocharger and dosing point and a urea tank, and FIG. 23 a schematic sketch of the two-part media line according to FIG. 22.

FIG. 22 presents a schematic sketch of a vehicle 7. An engine 71 is situated in the front region 70 of the vehicle 7. Provided adjacent to the engine 71 is a turbocharger 72 with adjacently arranged dosing point 73 and a urea tank line 74. The dosing point 73 lies between an SCR catalyst 75 and the turbocharger 72. The turbocharger and SCR catalyst are interconnected via a line 76 into which the tank line 74 empties. The SCR catalyst 75 is further connected with a particle filter 77 via a line 78. The rear region accommodates an exhaust system 79 along with a urea tank 80, which is connected with the tank line 74. As may be gleaned from FIG. 22, the tank line 74 extends from a location very close to the engine along the underbody 81 of the vehicle 7 in the rear region 82 of the vehicle 7. In the region close to the engine, it is therefore required that the tank line consist of a high temperature-resistant material, while this is not necessary in the rear region of the vehicle, since the latter, in particular the underbody region of the vehicle and the rear region 82, is comparatively cool, since precisely the region of the underbody 81 of the vehicle 7 is cooled by the airstream. Since high temperature-resistant lines are also expensive, it proves advantageous to here provide at least a two-part tank line as the media line for carrying urea as the medium with a fluidic separating point 83. In other words, two line parts can here be provided, one high temperature-resistant line part that extends from the fluidic separating point 83 to the dosing point 73, and a second line part 85 that extends from the fluidic separating point 83 to the urea tank 80. The high temperature-resistant material is advantageously a material that withstands temperatures of 120° to 180° C., in particular 140° C., for the short term, in particular for 15 minutes, and also temperatures of 200° C. The second line part 85 can be made out of a standard material, and thus be much less expensive than the first line part 84. As evident, the high temperature-resistant first line part 84 is also correspondingly shorter in design than the second line part 85.

Since the fluidic separating point 83 is situated on the vehicle floor or underbody 81, air flows around the latter, forcing a convection. In order to prevent the medium flowing through the fluidic separating point 83 in the form of urea from freezing, it is accordingly necessary to provide insulation in the form of the insulating element 4. As explained in the above figures, this can take place as follows. In particular, the tank line can be run between the fluidic separating point 83 and the rear region 82 of the vehicle 7 in the side members of the vehicle or along the latter, although this is not shown on FIG. 22.

Reference number 86 on FIG. 22 further denotes the height of the wade region of the vehicle, wherein it is evident that the engine block lies essentially over this line, while in particular the tank line lies above the latter. Providing the insulating element here proves especially advantageous, since, with the vehicle 7 in motion and potentially standing still, the distance from the engine 71 leads to a strong influence by existing low ambient temperatures, or to an intensive cooling by the airstream, given the arrangement underneath or in the vehicle floor.

Figure 23:
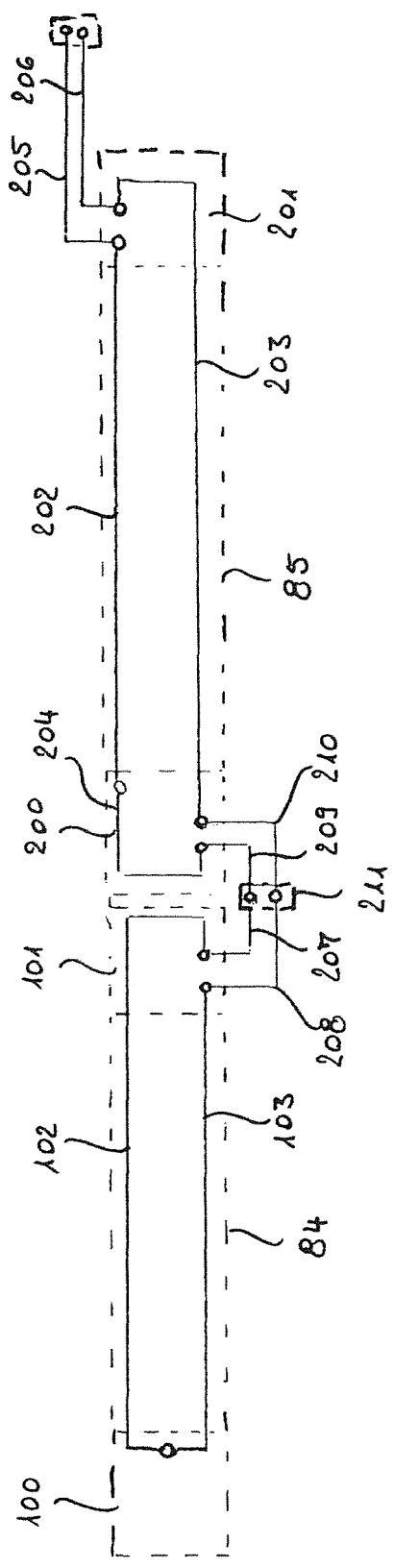

FIG. 23 presents a schematic sketch of the two line parts 84, 85, wherein the end side of both line parts each exhibit a connector assembly 100, 101 or 200, 201. The first connector assembly 100 is hooked up to the dosing point close to the engine, and the second connector assembly 101 is joined with the first plug connection 200 of the second line part 85 via mating. The second connector assembly 201 is connected to the urea tank 80. Respective heating elements 102, 103 or 202, 203, 204 extend along the two line parts 84, 85, in part also extending over the connector assemblies. The heating elements are used to heat the line parts along with the respective connector assembly on which they are situated. Provided remotely from the engine 71 is a heater for the connector assemblies 101, 200, 201. In the region of the connector assembly 101, the heating elements 202, 203 are hooked up to electrical feeders 205, 206, which are used for connection to an electric power source. To eliminate the need for supplying more power, the heating elements 203, 204 are connected with the heating elements 102, 103 via connecting heating elements 207, 208, 209, 210, which are situated in the region of the connector assembly 101, 200.

For example, the connecting heating elements 207, 209 and 208, 210 can be connected with each other by means of a connector 211, as denoted on FIG. 23. As already mentioned, the region of the first connector assembly 100 of the first line part 84 lies in the engine compartment in the region of the engine block or exhaust gas system/exhaust gas flow, while the second connector assembly 201 of the second line part 85 lies in the region of the connection to the urea tank 80, i.e., in the vehicle rear or potentially in a wheel recess of the vehicle. The connector assemblies 101 and 200 of the first line part 84 and second line part 85 lie in the vehicle underbody region, and as such should be especially well insulated, since convection is there encountered, which could otherwise cause the medium flowing through the line parts in the form of urea to freeze. The insulating element 4 is situated in this region, although this is not visible on FIG. 23.

Instead of being divided into two parts, the tank line 74 can also be divided into three or more parts. As already mentioned, the line part close to the engine is advantageously made out of a thermally or heat stable plastic, while the line part remote from the engine or the line parts remote from the engine can consist of a standard material, in particular standard plastic. Lines can be divided in this way for reasons of costs and assembly. Since enough heat is available in the engine region and little convection is encountered, no additional insulation need there be provided for the fluidic separating points, no more than in the region of the urea tank 80, since little convection arises there too.

Apart from the variants of insulating elements described above and shown on the figures for insulating a transition region between line parts connected with each other in a overplugging step, numerous others can still be provided, in which the insulating element as an axially compressible, in particular closed ring consists of a material that is provided with an inner passage opening and sparingly heat conductive in at least the outer region of the insulating element.

REFERENCE LIST

1 First connector assembly
2 Second connector assembly
3 Retaining element
4 Insulating element
5 Line part
6 Sealing cap
7 Vehicle
10 Connector part
11 Outer encapsulation
12 Protruding collar
13 Gap
14 Front side
15 overplugging region
16 Outside
20 Coupling part
21 Outer encapsulation
22 Front side
40 Inner layer
41 Outer layer
42 Central inner opening
43 Recess
44 Body
45 Heat conducting bushing
46 Outer plastic layer
47 Apron element
48 Ring-shaped air gap
50 Corrugated pipe/sheath
60 Flange
70 Front region of 7
71 Engine
72 Turbocharger
73 Dosing point
74 Tank line
75 SCR catalyst
76 Line
77 Particle filter
78 Line
79 Exhaust system
80 Urea tank
81 Underbody
82 Rear region of 7

83 Fluidic separating point
84 First line part
85 Second line part
86 Height line wade region
100 First connector assembly
101 Second connector assembly
102 First heating element
103 Second heating element
140 Lamination
200 First connector assembly
201 Second connector assembly
202 First heating element
203 Second heating element
204 Third heating element
205 Electric feeder
206 Electric feeder
207 Connecting heating element
208 Connecting heating element
209 Connecting heating element
210 Connecting heating element
211 Connector
d Diameter of 42
a Wall thickness of 4
$s_{Sp}$ Gap width
$s_0$ Original height of 4
$s_1$ Height of 4 given intensive compression
$s_2$ Height of 4 given slight compression in final assembly position

What is claimed is:

1. A multipart line, comprising:
an end side of a second line part provided with a second connector assembly having a coupling part that is provided with at least one retaining element and a female fitting,
a first line part having a first connector assembly having a connector part located at a distal end of the first connector assembly constructed as a male fitting having an internal passage through which media is flowable between a first end and a second end of the connector part of the first connector assembly,
wherein an outwardly projecting collar is present on an outer surface of the male fitting between the first end and the second end and has a larger diameter than the diameter of the male fitting,
wherein the first connector assembly and the second connector assembly each have an outer encapsulation,
wherein the connector part and the coupling part are connectable or connected to each other by pushing over and locking the at least one retaining element behind the outwardly projecting collar of the connector part such that the retaining element is located axially between the collar and a front side of the outer encapsulation of the first connector assembly,
wherein an overplugging region is present and is an intermediate region on the connector part between the collar and the front side of the outer encapsulation of the first connector assembly,
wherein after latching the coupling part and the connector part a gap having a gap width of $S_{Sp}$ is present in the overplugging region between i) the front side of the outer encapsulation of the first connector assembly and ii) a front side of the at least one retaining element,
wherein at least one insulating element is positioned completely in the overplugging region of the connector part of the connector assemblies that are connectable or connected to each other, and as an axially compressible, closed ring that is made out of a material that is slightly heat conducting at least in an outer region of the insulating element,
wherein the insulating element is provided with an inner passage opening through which the connector part extends, and
wherein the outer encapsulation of each of the first connector assembly and the second connector assembly each together with the insulating element insulates the first line part and second line part when joined together.

2. The multipart line according to claim 1, wherein after a mating process, the insulating element lies axially compressed in the gap between the first connector assembly and the second connector assembly, and the insulating element exhibits a first axial height $s_0$ in an uncompressed initial state, a second axial height $S_1$ while being overplugged and intensively compressed, and a third axial height $s_2$ in a final assembly position while exposed to a lower compression in comparison, wherein $s_0 < s_2 < s_1$, and wherein $s_0$ is greater than a gap width ($s_{Sp}$).

3. The multipart line according to claim 1, wherein for fastening the insulating element to the first connector assembly a positive connection and/or frictional connection and/or material bond and/or at least one fixing element, and/or a cap that is insertable/pluggable or inserted/plugged onto the connector part of the first connector assembly, and/or fastening via adhesive bonding.

4. The multipart line according to claim 1, wherein at least one axial support surface for supporting and axially bracing the insulating element is provided on one or more of the first connector assembly and the second connector assembly of the first and the second line part and/or the encapsulation enveloping the one or more of the first connector assembly and the second connector assembly of the first and the second line part.

5. The multipart line according to claim 4, wherein the insulating element is provided on at least one axial step of the encapsulation and/or the one or more of the first connector assembly and the second connector assembly of the first and the second line part.

6. The multipart line according to claim 1, wherein when in a built-in state, the insulating element lies compressed between two axial surfaces of the adjacent first connector assembly and the second connector assembly, and is in particular provided against or on a step or stop of the outer encapsulation and/or one or more of the first connector assembly and the second connector assembly of the first and the second line part.

7. The multipart line according to claim 1, wherein when in a built-in state and, after putting together the coupling part and connector part of two adjacent first connector assembly and the second connector assembly of two adjacent line parts, when in a compressed state, the insulating element is compressed by 5 to 30% by comparison to the uncompressed state.

8. The multipart line according to claim 1, wherein the insulating element consists at least partially of at least one foam material.

9. The multipart line according to claim 1, wherein the insulating element is designed with two layers, wherein an inner and outer layer are provided, with the inner layer in particular consisting of a different material than the outer layer and/or exhibiting a different foaming degree.

10. The multipart line according to claim 9, wherein the insulating element is heat conducting to provide for the transfer of heat through the insulating element given a provision of adjacent first connector assembly and the second connector assembly provided as being heat conducting and/or a connector part with a heat conducting design and a coupling part with a heat conducting design of the first connector assembly and the second connector assembly and/or their outer encapsulation with a heat conducting design.

11. The multipart line according to claim 10, wherein the inner layer of the insulating element is heat conducting in design, and the outer layer is insulating in design.

12. The multiple line according to claim 11, wherein the inner layer is an aluminum layer or a aluminum lamination of the outer layer and/or is designed as a heat conducting bushing.

13. The multiple line according to claim 12, wherein the heat conducting bushing is present and is a metal bushing or a stainless steel bushing.

14. The multiple line according to claim 8, wherein the insulating element is a closed-cell foam material.

15. The multipart line according to claim 1, wherein the insulating element exhibits an essentially round and/or polygonal outer shape.

16. The multiple line according to claim 15, wherein the insulating element exhibits a polygonal shape with rounded corner regions.

17. The multipart line according to claim 1, wherein recesses and/or openings are provided in a region of an inner passage opening of the insulating element for inclosing/encasing air to improve the insulating effect.

18. The multipart line according to claim 17, wherein a diameter (d) of the inner passage opening of the insulating element measures 3 to 6 mm, and that a wall thickness (a) of the insulating element measures 2 to 7 mm.

* * * * *